(12) United States Patent
Greenzeiger et al.

(10) Patent No.: US 9,059,950 B2
(45) Date of Patent: Jun. 16, 2015

(54) DELIVERING AND TRACKING VIRAL INVITATIONAL CONTENT

(71) Applicant: Apple Inc., Cupertino, CA (US)

(72) Inventors: Michael Froimowitz Greenzeiger, Sunnyvale, CA (US); Steven C. Bredenberg, Campbell, CA (US)

(73) Assignee: Apple Inc., Cupertino, CA (US)

( * ) Notice: Subject to any disclaimer, the term of this patent is extended or adjusted under 35 U.S.C. 154(b) by 323 days.

(21) Appl. No.: 13/667,552

(22) Filed: Nov. 2, 2012

(65) Prior Publication Data

US 2014/0129668 A1    May 8, 2014

(51) Int. Cl.
*H04L 12/58* (2006.01)
*H04L 12/24* (2006.01)
*H04L 29/06* (2006.01)
*G06Q 30/02* (2012.01)
*G06Q 50/00* (2012.01)

(52) U.S. Cl.
CPC .............. *H04L 51/12* (2013.01); *H04L 12/58* (2013.01); *H04L 12/5855* (2013.01); *H04L 12/585* (2013.01); *H04L 41/5093* (2013.01); *H04L 29/06346* (2013.01); *H04L 12/5885* (2013.01); *G06Q 30/02* (2013.01); *G06Q 30/0241* (2013.01); *G06Q 50/01* (2013.01)

(58) Field of Classification Search
CPC ... H04L 12/58; H04L 12/585; H04L 12/5855; H04L 12/5885; H04L 41/5093; H04L 29/06346
USPC ......... 709/206, 203, 204; 705/14.51, 321, 52; 715/720
See application file for complete search history.

(56) References Cited

U.S. PATENT DOCUMENTS

| 6,434,614 | B1 | 8/2002 | Blumenau |
| 8,010,657 | B2 | 8/2011 | Hall et al. |
| 8,229,788 | B2 | 7/2012 | Nyhan et al. |
| 2010/0121709 | A1* | 5/2010 | Berezin et al. ............. 705/14.51 |
| 2010/0211457 | A1 | 8/2010 | Martin-Cocher et al. |
| 2010/0318611 | A1* | 12/2010 | Curtin et al. .................. 709/206 |
| 2011/0078232 | A1* | 3/2011 | Van Den Driessche ...... 709/203 |
| 2011/0276507 | A1* | 11/2011 | O'Malley ...................... 705/321 |
| 2011/0307385 | A1* | 12/2011 | St. Pierre et al. ............... 705/52 |
| 2012/0131103 | A1* | 5/2012 | Fox ................................ 709/204 |
| 2014/0129942 | A1* | 5/2014 | Rathod ........................ 715/720 |

FOREIGN PATENT DOCUMENTS

WO      2009/078861 A1    6/2009

* cited by examiner

*Primary Examiner* — Le H Luu
(74) *Attorney, Agent, or Firm* — Novak Druce Connolly Bove + Quigg LLP

(57) ABSTRACT

Disclosed herein are systems, methods, and non-transitory computer-readable storage media for managing a viral invitational content campaign. Invitational content is delivered with a user interface element that, upon selection, transmits a forwarding request to the content delivery server. The content delivery server generates a link with a unique identifier and creates a forwarding entry that includes the unique identifier and identifies the item of invitational content. The link is returned in response to the forwarding request. Upon selection of the link, a request including the unique identifier is transmitted to the content delivery server which accesses the corresponding forwarding entry to return the corresponding item of invitational content. A viral campaign dictates a target spend range and throttling methods are utilized to manage the spend. Invitational content forwarding, delivery cost, and content selection are variable to manage the spend. Calculated metrics are also used to manage spend.

27 Claims, 6 Drawing Sheets

DELIVERING AND TRACKING VIRAL INVITATIONAL CONTENT

BACKGROUND

1. Technical Field

The present disclosure relates to invitational content and more specifically to managing a viral invitational content campaign

2. Introduction

The Internet has made sharing information faster and easier than ever. Wireless computing devices such as smartphones allow users to be reached at any time and at any location. Users can easily share information directly with another user via e-mail, text message, short message service (SMS), etc. Further, social networking sites allow users to share information with a network of friends by simply posting information to the social networking website. As a result, information can go viral and be spread around the world in a short period of time.

Content providers have tried to take advantage of this by launching viral campaigns with the goal of having content shared virally by users. While advantageous in spreading content, viral campaigns create new obstacles. For example, tracking and managing a viral campaign can be difficult because of its unpredictable nature. Accordingly, an improved method of implementing a viral campaign is needed.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for managing a viral invitational content campaign. To create a viral invitational content campaign, a content delivery server can be configured to deliver invitational content with a user interface element enabling a user to forward the item of invitational content. Forwarding the item of invitational content can include creating a link to the item of invitational content and transmitting the link to specified destination or posting the link on a social networking website.

Upon selection of the user interface element, a forwarding request can be transmitted to the content delivery server requesting that that the item of invitational content be forwarded. The forwarding request can include forwarding data used to forward the item of invitational content. For example, forwarding data can identify the item of invitational content, a page or view of the item of invitational content, a destination, etc.

Upon receiving the forwarding request, the content delivery server can generate a unique identifier and create a forwarding entry that includes the unique identifier as well as an identifier identifying the item of invitational content to be forwarded. The unique identifier can be appended to a link to the content delivery server and the link with the appended unique identifier can be returned to the requesting user device.

The requesting user can use the link to forward the item of invitational content by transmitting the link to a friend or posting the link to a social networking website. Upon selection of the link, a request including the unique identifier can be transmitted to the content delivery server. The content delivery server can use the unique identifier to access the corresponding forwarding entry and identify the requested item of invitational content. The content delivery server can then return the item of invitational content in response to the received request.

The content delivery server can be further configured to manage the delivery of the item of invitational content as part of a viral campaign that dictates a target spend range. The content delivery server can utilize multiple throttling methods to manage the spend of the campaign to maintain the campaign within the target spend range. For example, to increase the spend of the viral campaign, the content delivery server can provide the user interface element enabling a user to forward the item of invitational content along with a delivered item of invitational content. Conversely, to reduce the spend, the content delivery server can deliver the item of invitational content without the user interface element so that the item of invitational content cannot be forwarded.

In some embodiments, calculated metrics can be used to manage the campaign spend. For example, to increase the spend, the item of invitational content can be delivered in response to a request that has been determined to have a high viral coefficient. In some embodiments, the spend can be maintained by varying the cost associated with delivering the item of invitational content or delivering the item of invitational content free of charge. In some embodiments, the spend of the campaign can be managed by delivering a different item of invitational content or delivering a redirect URL to different content in response to a request.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
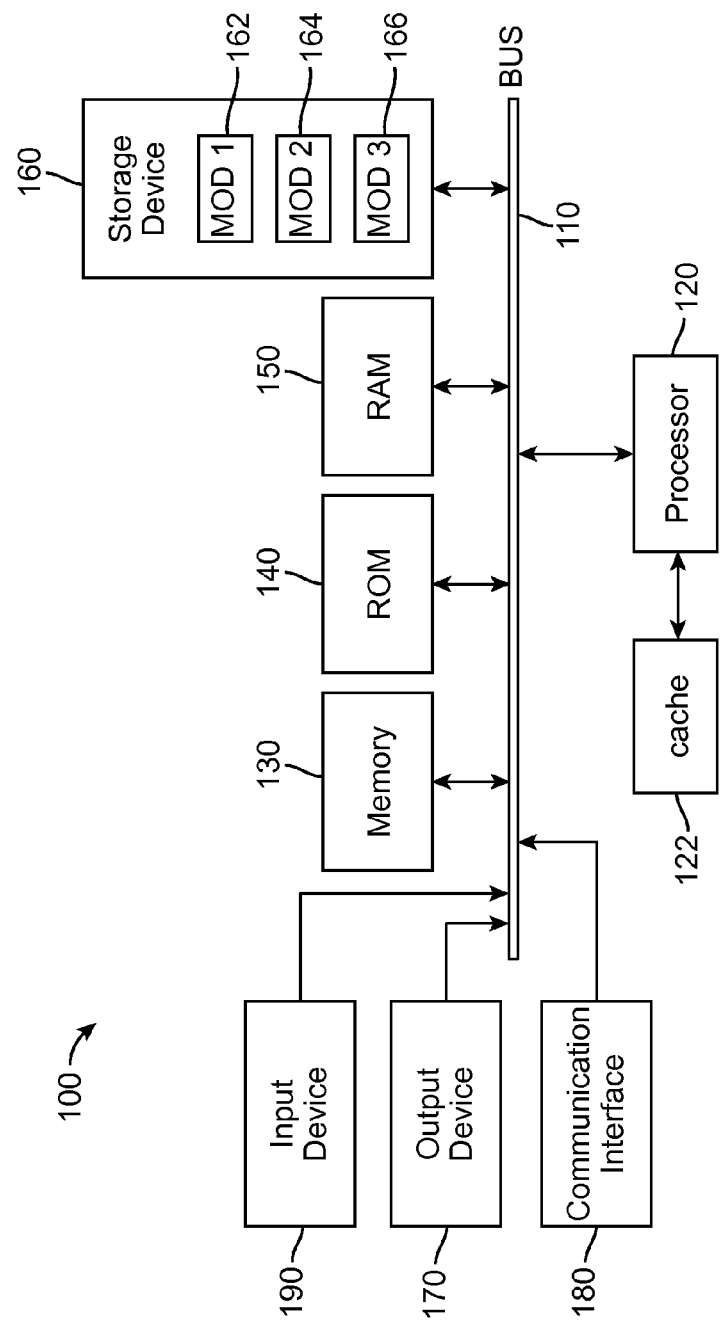
FIG. 1 illustrates an exemplary embodiment of a general-purpose computing device.

FIG. 1 illustrates an exemplary system 100 that includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache 122 provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example, the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
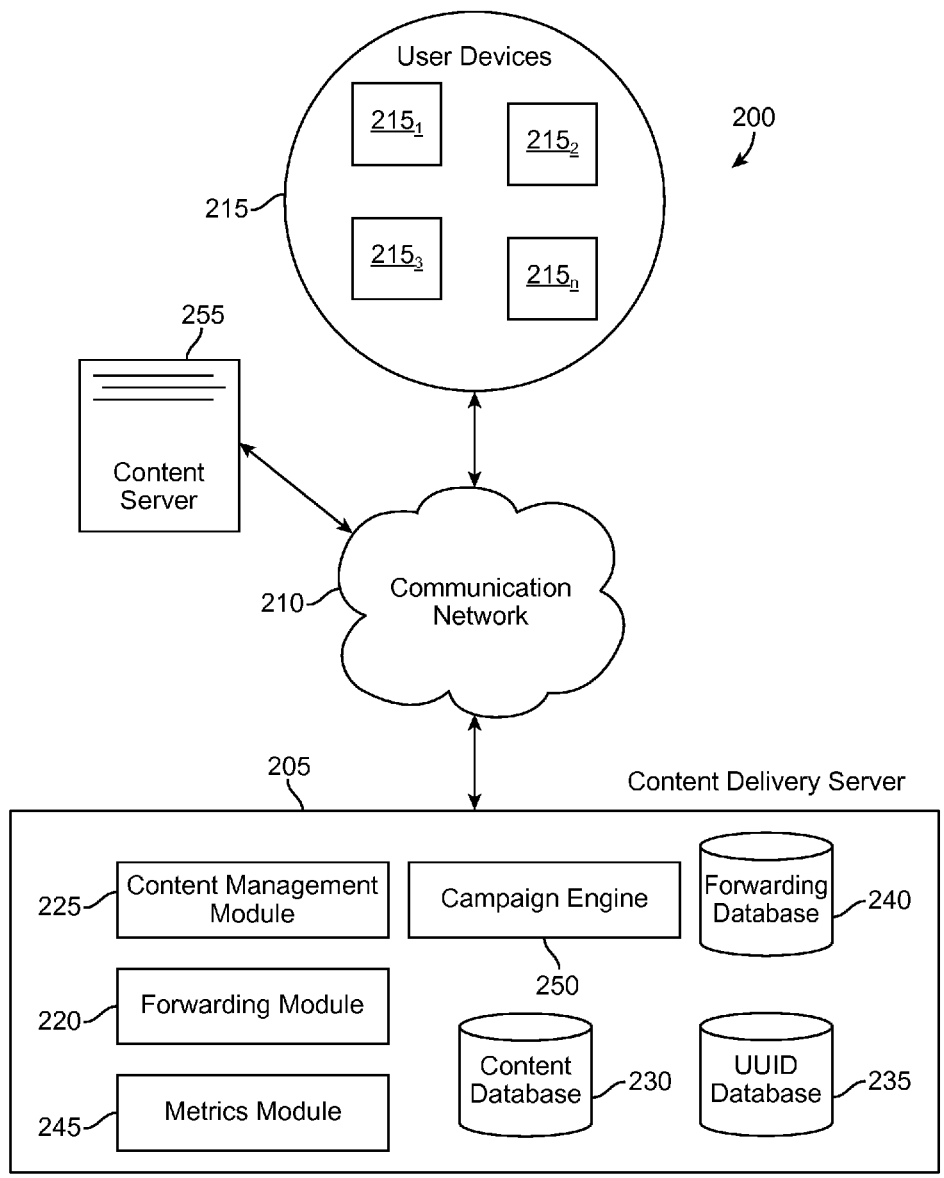
FIG. 2 illustrates a general purpose computing environment wherein invitational content can be forwarded as part of a viral invitational content campaign.

Having disclosed some components of a computing system, the disclosure now turns to FIG. 2, which illustrates a general purpose computing environment 200 wherein invitational content can be forwarded as part of a viral invitational content campaign.

As illustrated, multiple computing devices can be connected to a communication network 210 and be configured to communicate with each other through use of the communication network 210. The communication network 210 can be any type of network, including a local area network ("LAN"), such as an intranet, a wide area network ("WAN"), such as the internet, or any combination thereof. Further, the communication network 210 can be a public network, a private network, or a combination thereof. The communication network 210 can also be implemented using any number of communications links associated with one or more service providers, including one or more wired communication links, one or more wireless communication links, or any combination thereof. Additionally, the communication network 210 can be configured to support the transmission of data formatted using any number of protocols.

Multiple computing devices can be connected to the communication network. A computing device can be any type of general computing device capable of network communication with other computing devices. For example, a computing device can be a personal computing device such as a desktop or workstation, a business server, or a portable computing device, such as a laptop, smart phone, or a tablet PC. A computing device can include some or all of the features, components, and peripherals of computing device 100 of FIG. 1. To facilitate communication with other computing devices, a computing device can also include a communication interface configured to receive a communication, such as a request, data, etc., from another computing device in network communication with the computing device and pass the communication along to an appropriate module running on the computing device. The communication interface can also be configured to send a communication to another computing device in network communication with the computing device.

As illustrated in FIG. 2, the exemplary system includes various computing devices in network communication with each other to deliver, forward, and track invitational content as part of a viral campaign. In particular, FIG. 2 shows a content delivery server 205 configured to deliver invitational content to user devices $215_1 \ldots 215_n$ (collectively "215"), where the content delivery server 205 and the user devices 215 are communicatively coupled via communication network 210. For ease of explanation, user devices 215 will be discussed as a single user device 215. This is not meant to be limiting, however, and it should be understood that the system can include multiple user devices 215, each including the functionality described in this disclosure. Further, the content delivery server 205 can be configured to communicate with any number of user devices 215 to perform the functionality described.

In operation, the content delivery server 205 can be configured to receive requests from a user device 215 for a content package of electronic-invitational content. Responsive to receiving the request, the content delivery server 205 can be configured to create a content package and return the content package to the user device 205.

A content package can include one or more items of electronic content capable of being processed and/or rendered by a computing device. For example, a content package can include one or more items of invitational content. As used herein, the term "invitational content" is content which can be rendered on a computing device. For example, invitational content can include a web page, an application, a game, or media, etc. In the various embodiments, one or more types of invitational content can be combined in a content package. For example, the invitational content can include text, graphics, audio, video, executable code or any combination thereof.

The content delivery server 205, therefore, can be configured to select at least one item of invitational content to create the content package.

Upon receipt of the content package from content delivery server 205, the user device 215 can be configured to render the invitational content included in the content package. The rendering of the invitational content by the user device 215 can vary depending on the form of the invitational content in the content package. Upon successfully rendering delivered invitational content, the user device 215 can be configured to send a notification to the content delivery server 205.

In some embodiments, the invitational content can be associated with a product or can directly or indirectly advertise a product. In some embodiments, the content package can be configured to replace or update invitational content in a content package already delivered to the user device 215.

Further, the invitational content can be active invitational content. That is, invitational content that is designed to primarily elicit a pre-defined response from the user. For example, active invitational content can include one or more types of advertisements configured to be clicked upon, solicit information, or be converted by the user into a further action, such as a purchase or download of the advertised item. In some embodiments, active invitational content can include secondary views that can be presented to a user upon selection of an initial view of the invitational content. For example, the initial view can be a banner advertisement that, when selected, directs the user to a secondary view such as a multimedia advertisement. In some embodiment, the invitational content can include multiple pages or views that a user can navigate between.

Invitational content can also include passive invitational content. That is, invitational content that is designed to primarily inform the user. In some cases, passive invitational content can include information that can lead or direct users to active invitational content. Additionally, the invitational content can be dynamic invitational content. That is, invitational content that varies over time or that varies based on user interaction with the invitational content. However, the various embodiments are not limited in this regard and the invitational content can be static invitational content that does not vary over time or that varies based on user interaction. In the various embodiments, an item of invitational content in a content package can be static or dynamic and active or passive. Further, various types of invitational content can be combined in a same content package.

As noted above, the content delivery server 205 selects the invitational content in response to the request and transmits the assembled invitational content to the requesting user device 215. In some embodiments, the content delivery server 205 preselects the invitational content before the request is received. Thereafter, the content delivery server 205 assembles a content package of invitational content and causes the content package to be delivered to the user device 215.

The content delivery server 205 can include a content management module 225 that facilitates generation of the assembled content package, which can include invitational content. Specifically, the content management module 225 can combine content from one or more content providers to generate the assembled content package for the user device 215. In some embodiments, the content management module 225 can request invitational content from a content server 255 in network communication with the content delivery server 205 to generate the assembled content package for the user device 215. In some embodiments, the content management module 225 can request that the content server 255 deliver the invitational content directly to the requesting user device 215.

In some embodiments, the content delivery server 205 can include a content database 230 configured to store invitational content and the content management module 225 can select invitational content from the content database 230 to generate the assembled content package for the user device 215. The data in the content database 230 can be refreshed or updated on a regular or dynamic basis to ensure that the content in the database 230 is up-to-date at the time of a request from the user device 215.

In some embodiments, there can be multiple variants of an item of invitational content, and the content management module 225 can be configured to select proper variants to generate the assembled content package for the user device 215. For example, the entire item of invitational content can be offered in variant forms and the content management module 225 can select one of the variants. In some embodiments, the item of invitational content can be assembled by combining multiple parts and a variant of each part can be offered such that the content management module 225 can select a variant of each part to assemble the item of invitational content.

Variants of invitational content can be selected in numerous ways and based upon numerous criteria. For example, in some embodiments, the content management module 225 can be configured to select from multiple variant forms of invitational content based upon demographic data associates with the user of the user device 215. Thus, a variant of an item of invitational content determined to be optimal for a specified demographic group can be selected upon a determination that the user of the user device 215 is a part of that demographic group. Demographic data can be collected from the user device 215, or in some embodiments, from a stored user profile associated with the user device 215 (described below).

In some embodiments, the content management module 225 can be configured to select a variant form of invitational content based upon the user device 215, a determined network connection associated with the user device 215, or based upon any other factor(s) or criteria. For example, some variants of the item of invitational content can be better suited to be rendered on specific types of devices. Further, some user devices can be configured to only support certain media types. Accordingly, the content management module 225 can be configured to select a variant of the invitational content that includes a media type that is compatible with the user device 215.

Alternatively, as described above, the content management module 225 can be configured to select a variant form of invitational content based upon the determined network connection associated with the user device 215. For example, the content management module 225 can be configured to select a less resource intensive variant of the invitational content upon a determination that the user device 215 is connected via a low bandwidth network connection. Alternatively, the content management module 225 can select a higher resource intensive variant of the invitational content upon a determination that the user device 215 is connected via a high bandwidth connection.

In some embodiments, the invitational content can be assembled at the user device 215. For example, the invitational content parts can be delivered to the user device 215 and assembled at the user device 215 based on assembly rules dictating how to properly assemble the invitational content. In some embodiments, the assembly rules can be delivered to the user device 215 by the content delivery server 205, at the same or different times as the invitational content parts.

The disclosed system can also be configured to enable a user to forward a delivered item of invitational content. Forwarding invitational content can include creating a link to the item of invitational content as well as transmitting the link to a destination such as a specified recipient or posting the link to a social networking site. For example, a user that wishes to share an item of invitational content with a friend or an online social network can forward a link to the invitational content to the friend's e-mail or post the link on a social networking website. Forwarding the item of invitational content in this manner allows the item of invitational content to be spread virally throughout the web.

To achieve this, the content management module 225 can be configured to include a user interface element with a delivered item of invitational content. The user interface element can be configured to enable a user to forward the item of invitational content to a selected destination. The user interface element can be any type of interface element that enables a user to input a selection. For example the user interface element can be a button, checkbox, text field, etc.

Upon receiving an input from the user interface element, the user device 215 can be configured to create a forwarding request and send the forwarding request to the content delivery server 205. The content delivery server 205 can include a forwarding module 220, configured to receive the forwarding request and, in response, create a link to the item of invitational content. The forwarding module 220 can be configured to return the link to the user device 215 or forward the link to a specified destination. For example, the forwarding module can be configured to post the link to a specified social networking website or send the link to a specified recipient e-mail, short messaging service address, etc. In some embodiments, the link is returned to the requesting user device 215 and the user can post the link to a social networking site or send it to a friend.

In some embodiments, the forwarding request can include forwarding data. For example, forwarding data can include data identifying the item of invitational content, the desired destination, the location from which the invitational content was accessed, the requesting user, the requesting user device's unique user identifier (UUID), a specific page or view of the invitational content, demographic data describing the user, specifications of the user device, etc.

The invitational content can be configured to gather this data from the item of invitational content itself, an application on the user device 215, the user device 215, etc. For example, the user device 215 can be configured to communicate with the operating system running on the user device 215 to gather data regarding the user device 215 and the user of the user device. Further, the invitational content can communicate with components of the user device 215 to gather forwarding data. For example, the invitational content can communicate with a GPS component of the user device 215 to gather the location of the user device 215. In some embodiments, the invitational content can communicate with a communication interface of the user device 215 to determine the current network connection being used by the user device 215. These are just two examples and are not meant to be limiting. One skilled in the art would recognize that any variety of information can be gathered from the user device and included as forwarding data.

The item of invitational content can also gather forwarding data from the item of invitational content itself. For example, the item of invitational content can retrieve an identifier embedded within the item of invitational content that identifies the item of invitational content. Further, the item of invitational content can determine the current view or page of the item of invitational content being displayed on the user device 215 and include this data in the forwarding request.

In some embodiments, the invitational content can be configured to retrieve data identifying the location of the invitational content and include this data in the forwarding request. The location of an item of invitational content can be an application or website associated with the invitational content from which the item of invitational content is accessed. For example, in a scenario in which the invitational content is a banner advertisement being displayed within a website, the location of the invitational content can be the website in which the banner advertisement is being displayed. Further, the location can include the exact page within the website from which the item of invitational content was accessed.

In some embodiments, the item of invitational content can include multiple user interface elements, each prompting the user to forward the item of invitational content to a different destination. The destination can thus be determined based on the user interface element selected. For example, an item of invitational content can include two buttons, one button prompting the user to forward the item of invitational content to a friend via e-mail, the other prompting the user to post the item to a social networking website. The destination can be set based upon the button selected and be included as forwarding data identifying the destination in the forwarding request.

In some embodiments, the invitational content can prompt the user to type in forwarding data. For example, the invitational content can prompt the user to enter a destination e-mail address or the user's user name and password to a social networking website. The entered data can be included as forwarding data sent to the content delivery server 205 as part of the forwarding request. The above discussed types of forwarding data and methods of collecting forwarding data are just examples and not meant to be limiting. One skilled in the art would recognize that forwarding data can include any type data that can be gathered by the invitational content by any means known in the art.

The forwarding module 220 can be configured to receive a forwarding request from a user device 205 and create a link to the item of invitational content. For example, the forwarding module 220 can identify the item of invitational content from the forwarding data included in the forwarding request and create a link to the item of invitational content.

In some embodiments, the forwarding module 220 can create a link to the content delivery server 205 and append a unique identifier to the link that identifies the item of invitational content. Upon selection of the link, a request including the appended unique identifier can be transmitted to the content delivery server 205. The forwarding module 220 can be configured to receive the request and return the appropriate item of invitational content based upon the received unique identifier.

The forwarding module 220 can be configured to create the unique identifier in any number of ways. For example, the forwarding module 220 can include an algorithm configured to generate the unique identifier. The algorithm can use any known method to create a unique identifier. For example, in some embodiments, the unique identifier can be a number and the algorithm can be configured to increment the number to generate each unique identifier and ensure that no two unique identifiers are the same. This is just one example and is not meant to be limiting. The unique identifier can be generated in any number of ways known in the art.

The forwarding module 220 can also be configured to create a forwarding entry for each forwarding request received from a user device 205. The content delivery server 205 can include a forwarding database 240 configured to store forwarding entries. The forwarding module 220 can be configured to communicate with the forwarding database 240 to store, edit, search, and retrieve data and thus create a forwarding entry in the forwarding database 240.

A forwarding entry can include the unique identifier generated in response to a forwarding request and an identifier identifying the item of invitational content requested to be forwarded. Upon receiving a request for an item of invitational content including a unique identifier, the forwarding module 220 can match the received unique identifier with the appropriate item of invitational content by matching the received unique identifier with the forwarding entry associated with the unique identifier. The forwarding module 220 can retrieve the identifier identifying the item of invitational content associated with the corresponding forwarding entry and use it to return the appropriate item of invitational content.

In some embodiments, the forwarding entry can include data identifying the specific page or view of the item of invitational content that the user requested to forward. For example, the forwarding module 220 can receive forwarding data identifying the specific page or view as part of the forwarding request and store the data in the forwarding entry. The forwarding module 220 can use this data to present the appropriate page or view of the item of invitational content when a request including the unique identifier is received by the content delivery server 205.

Upon creating the link to the forwarded item of invitational content, the forwarding module 220 can either return the link to the requesting user device 215, or, in some embodiments, the forwarding module 220 can transmit the link to a specified destination. For example, the specified destination can be included as part of the forwarding data received with the forwarding request. The forwarding module 220 can use the included forwarding data to forward the link to the specified destination. For example, the forwarding module can access a user's social networking account using the included forwarding data and post the created link. Alternatively, the forwarding module 220 can be configured to transmit the created link to a specified recipient address, such as an e-mail address, short message service (SMS) address, etc.

In some embodiments, the forwarding module 220 can be configured to return the created link to the requesting user device 215. The requesting user can use the received link to post the link to a social networking device or transmit to another user via e-mail or SMS. For example, the requesting user can e-mail the link to a friend.

In some embodiments, the forwarding module 220 can be configured to return the link to the user device 215 and present the link as well as prompt the user for further data. For example, the link can be presented in a secondary view above the item of invitational content. The secondary view can be configured to prompt the user to enter further data. For example, the secondary view can prompt the user to enter a destination for the link. In some embodiments, the secondary view can include user interface elements configured to receive a user input indicating the selected destination. The user input can be used to forward the link to the selected destination.

Figure 3B:
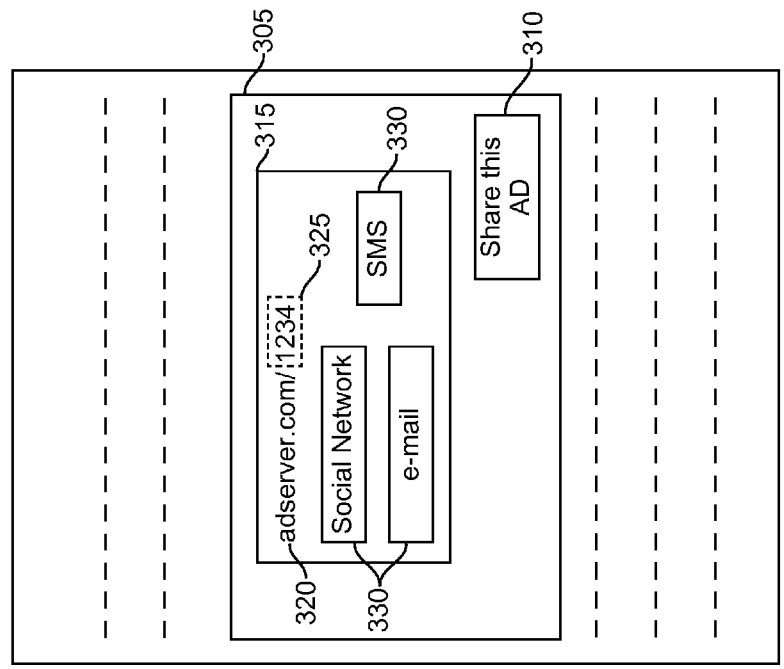
FIGS. 3a and 3b illustrate screenshots of an exemplary item of invitational content in a viral campaign.
Figure 3A:
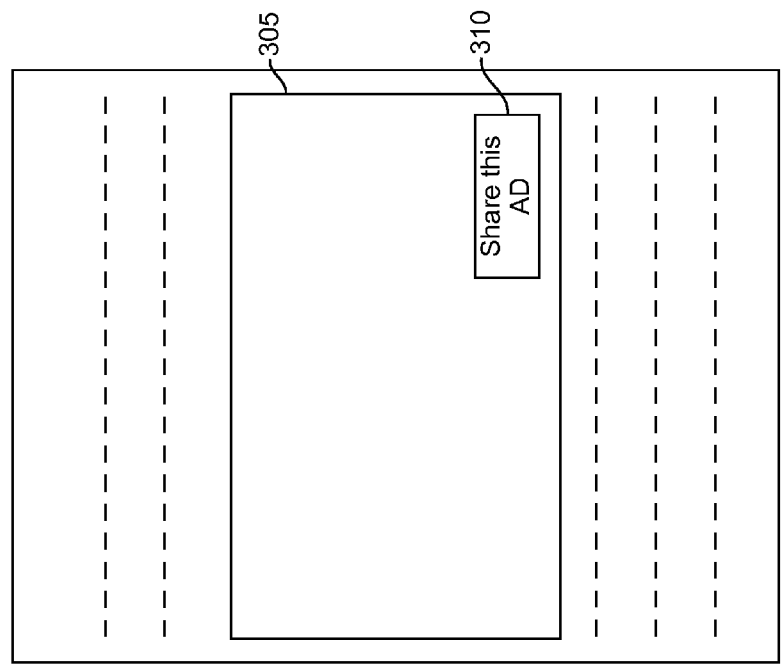

FIGS. 3a and 3b illustrate screenshots of an exemplary item of invitational content in a viral campaign. As illustrated in FIG. 3a, the item of invitational content 305 is an advertisement that includes a user interface element button 310 prompting the user to share the advertisement. Upon selection of the user interface button 310, a forwarding request is created and sent to the content delivery server.

FIG. 3b illustrates a screenshot of the item of invitational content 305 after the user has selected the user interface button 310. As illustrated, a secondary view 315 is presented over the item of invitational content 305. The secondary view 315 includes a returned link 320 to the item of invitational content 305. The returned link 320 includes a unique identifier 325 appended to the end of the link. Further, the secondary view 315 includes further user interface element buttons 330 that prompt the user to select a destination. The user interface buttons 330 prompt the user to post the link to a social networking site, email the link to a friend, or send the link to another user via SMS or instant messaging.

Upon selection of one of the user interface elements 330, the link 320 can be transmitted to the chosen destination. Alternatively, the user can use the presented link 320 to share the item of invitational content 305 without using the provided user interface element buttons 330. For example, the user can copy and paste the link 320 into an e-mail, SMS or post it on a social networking site. Alternatively, the user can manually enter the provided link 320 into an e-mail, SMS, instant message, social networking site, etc.

Returning to FIG. 2, the content delivery server 205 can also be configured to track communications between the content delivery server 205 and the various user devices 215. For example, the content delivery server 205 can also include a unique user identifier (UUID) database 235 that can be used for managing sessions with multiple user devices 215. The UUID database 235 can be used with a variety of session management techniques. For example, the content delivery server 205 can implement an HTTP cookie or any other conventional session management method (e.g., IP address tracking, URL query strings, hidden form fields, window name tracking, authentication methods, and local shared objects) for user devices 215 connected to content server 205 via a substantially persistent network session. However, other methods can be used as well. For example, in the case of handheld communications devices, such as mobile phones, smart phones, tablets, or other types of user devices 215 connecting using multiple or non-persistent network sessions, multiple requests for content from such devices may be assigned to a same entry in the UUID database 235. The content delivery server 205 can analyze the attributes of requesting user devices 215 to determine whether such requests can be attributed to the same user. Such attributes can include device or group-specific attributes.

The content delivery server 205 can further record all activity associated with a UUID. For example, the content delivery server 205 can log all requests received by a user device 215 with the corresponding entry in the UUID database 235. The log can include further data regarding each logged request such as the type of device used to make the request, time, day, network connection used, location, content associated with the request, unique identifier, etc. This can also include data regarding the interaction with invitational content such as how long was spent viewing an item of invitational content, the amount of invitational content viewed (i.e., views, pages, etc.), etc.

The UUID database 235 can also contain demographic data associated with each entry in the UUID database 235. For example, demographic data can include a user's name, address, age, likes, dislikes, previous history, etc. The demographic data can be received from a user of a user device 215 or inferred from data collected by the content delivery server 205. For example, user likes and dislikes can be inferred from a user's previous requests for invitational content and user interaction with the invitational content.

One advantage of forwarding invitational content in the disclosed manner is that each forwarded item of invitational content can be tracked individually because each forwarded item of invitational content is associated with a unique identifier. The forwarding module 220 can log each request as it is received from a user device 215 in the UUID database 235 and associate the unique identifier associated with the request or the unique identifier generated as a result of receiving a forwarding request.

The data gathered in the UUID database 235 can be used to compute metrics regarding forwarded invitational content and to optimize a viral campaign. For example, the content delivery server 205 can include a metrics module 245 configured to access the stored data and calculate metrics associated with the forwarding of invitational content. In some embodiments, the metrics module 245 can use the data to calculate an estimated number of additional views the item of invitational content will receive when delivered to a specific user, location, etc.

In some embodiments, the metrics module 245 can calculate a forwarding time associated with a user, location, etc. that represents an estimated amount of time that will elapse between the item of invitational content being delivered to the user, location, etc. and the item of invitational content being forwarded. For example, the metrics module 245 can be configured to calculate the average amount of time for an item of invitational content to be forwarded upon being delivered to the particular user, location, etc.

In some embodiments, the metrics module 245 can use the data to calculate the expected viral growth associated with delivering the item of invitational content to a specific user, location, etc. This can be calculated as a viral coefficient (K) indicating the expected growth rate. For example, the viral coefficient associated with delivering the item of invitational content to a specific user would indicate the number of new users that will forward the item of invitational content as a result of delivering the item of invitational content to the specific user. A viral coefficient equal to 1 (K=1) can indicate that it can be expected that items of invitational content delivered to the specific user will on average result in one new user forwarding the item of invitational content. Thus the campaign will continue but at a constant rate. A viral coefficient of less than 1 (K<1) can indicate that on average delivery of the item of invitational content to the specific user will result in less than one new user forwarding the item of invitational content. Further, this indicates that the campaign will eventually die out. A viral coefficient greater than 1 (K>1) can indicate that on average, delivery of the item of invitational content to the specific user will result in more than one new user forwarding the item of invitational content and thus resulting in the viral campaign expanding at an increasing rate.

In some embodiments, the viral coefficient calculated for a specific user is calculated based upon the average number of times the specific user forwards an item of invitational content and the average percentage of those forwards that result in a re-forward by a new user. For example, assuming that the specific user on average forwards an item of invitational content 10 times, and on average 10% of the forwards made by the specific user result in a re-forward by a new user, it can be determined that, on average, delivering an item if invitational content to the specific user will result in 1 forward by a new user because 10% of 10 is 1. Thus the specific user has a viral coefficient of 1. Alternatively, if the specific user on average only forwards items of invitational content 5 times then delivering the item of invitational content to the specific user will only result in 10% of 5, (0.5) new users forwarding the item of invitational content. Thus the specific user has a viral coefficient of 0.5, which is less than one.

This is just one possible way of calculating viral coefficient and is not meant to be limiting. One skilled in the art would recognize that viral coefficient can be calculated in any number of ways and associated with any number of factors.

The metrics module 245 can use calculated metrics, such as the viral coefficient, to determine users or factors that are key influencers to the success of a viral campaign. This data can be used to manage the delivery of invitational content in a campaign. In some embodiments, a viral coefficient can be calculated for the item of invitational content itself. For example, the viral coefficient can indicate the expected viral growth of delivering the item of invitational content regardless of other factors.

In some embodiments, the viral coefficient can be calculated for a group of users. For example, data gathered regarding a population of users can be analyzed to calculate a viral coefficient of the population of users. In some embodiments, data gathered regarding a population of users can be segmented to determine a viral coefficient of the segment of users. For example, a viral coefficient can be calculated for users that are men or between a specified age group. Further, a viral coefficient can be calculated for a segment of users that share specified interests or are requesting invitational content from a specified application or location. For example, a viral coefficient can be calculated for a segment of users that are requesting invitational content from a specified video game application or from a specified website. Thus the viral coefficient calculated for the segment of users can indicate the likely number of new users that will forward the item of invitational content as a result of delivering the item of invitational content to a user within the segment. Calculating a viral coefficient for a group of users can be useful in determining whether to return an item of invitational content to a requesting user for which no prior data has been collected. For example, a requesting user that has no history of viewing or forwarding invitational content can be assigned a viral coefficient based upon a segment to which the requesting user belongs. Thus a requesting user that likes sports can be assumed to have a viral coefficient similar to other users that like sports even though no data specific to that user is available.

In some embodiments, the metrics module 245 can calculate a variety of metrics associated with a user that are based on the performance of the user's contacts. For example, these 'contacts metrics' can indicate the tendencies or expected behavior of the user's contacts and thus be indicative of the expected performance of invitational content delivered to the user. The various contacts metrics can indicate the amount of time a user's contacts spend viewing items of invitational content, how much invitational content the users' contacts view, etc.

In some embodiments, contacts metrics can be based upon metrics known about the user's contacts. For example, the average amount of time each of the user's contacts spends viewing an item of invitational content can be averaged to determine the average amount of time the group of contacts as a whole views items of invitational content. In some embodiments, the values associated with some contacts can be weighted differently based upon the amount of interaction the user has with the contact. For example, contacts to which the user frequently forwards items of invitational content can be given greater weight and have a greater influence on the calculated metric.

In some embodiments, the contacts metrics can be calculated based upon a subset of the user's contacts. For example, the subset can consist of only those contacts with which the user has had some predetermined minimum amount of contact with during a specified time period. For example, the contacts metrics can be based on the values associated with contacts to which the user has forwarded items if invitational content with the past 3 months. In some embodiments, the data used to calculate contacts metrics associated with a user can be limited to data gathered from the user's contacts while interacting with items of invitational contact forwarded by the user. This can represent an accurate depiction of the user's contacts when receiving forwarded items of invitational content from the specific user. The unique identifier associated with each item of invitational content forwarded by the user can be used to track all interactions with items of invitational content forwarded by the user. Thus each time a request including the unique identifier is received; data regarding the requesting user as well as the requesting user's interaction with the item of invitational content can be gathered and associated with the user that forwarded the item of invitational content. The gathered data can be used to calculate contacts metrics that are associated with the forwarding user.

The content delivery server 205 can include a campaign engine 250 which can be configured to fulfill campaigns for content providers by managing inventory and pricing of invitational content delivered to user terminals 215. Content providers can arrange to have their invitational content delivered by the content delivery server 205 based on a pricing scheme. The pricing scheme can be based on eliciting a specified user response. For example, in some embodiments the pricing scheme can be arranged so that a content provider is charged a set price for eliciting a user response of viewing the invitation content. Each time a user views the invitational content can be counted as an invitational content impression. An impression can be counted as every time an item of invitational content is displayed at the user device 215 for at least a predetermined amount of time. For example, if the invitational content is a banner advertisement, an impression can be counted if the banner advertisement is displayed on a user device 215 for 60 seconds. In some embodiments the predetermined time can vary according to the invitational content. For example, the invitational content can be a video and so an impression can be counted upon completion of the video.

In some embodiments, the pricing scheme can be based on eliciting a user response to invitational content. For example, a campaign can charge for each conversion associated with delivered invitational content. A conversion can be counted in many ways. For example, in some embodiments a conversion can be counted when a user clicks on a banner advertisement and is forwarded to additional content. In some embodiments a conversion can be counted when a user purchases a product advertised by the invitational content. Although impression and conversion are used as examples, any pricing scheme or combination of can be used.

A content provider can arrange a campaign in any number of ways. In some embodiments, a content provider can choose a maximum cost limit for a period of time. For example a campaign can be configured so that the cost of delivering the invitational content does not exceed $10,000 over a month. In some embodiments the campaign can be configured to have a price limit over a time interval as well as another limit for a smaller time period. For example, a campaign can be allocated $10,000 over a month, but not to exceed $500 in any given day. Campaigns can also be configured to have a minimum amount to be spent per specified time period. For example, a campaign can have a daily max of $1,000 per day as well as a minimum of $950 per day. These examples are not meant to be limiting, campaigns can be configured in any number of ways known in the art.

The campaign engine 250 can be arranged to manage the delivery of the invitational content based on the parameters of the campaign. For example, if a content provider has arranged a maximum limit of $1,000 per day, the campaign engine 250 can monitor the number of impressions and conversions, and upon the limit being reached, no longer deliver the item of invitational content associated with the campaign. Rather, the campaign engine 250 can select other items of invitational content to deliver upon receiving a request from a user device 215. Ensuring that the maximum limit is not exceeded can be important because in some embodiments the content provider is not liable to pay more than the maximum limit per day and so any impressions or conversions above the limit are provided free of charge to a content provider.

Managing a budget in a viral campaign presents new obstacles because the campaign is at least partially spread virally rather than solely by the content delivery server 205. Requests received from a forwarded item of invitational content include a unique identifier and thus specify the specific item of invitational content to be returned. As a result, the campaign engine 250 cannot completely cease delivering an item of invitational content when a campaign limit has been reached without returning errors or delivering a different item of invitational content than was requested. In some embodiments, the campaign engine 250 can be configured to deliver items of invitational content beyond the campaign limit at no charge.

In some embodiments, the campaign engine 250 can implement various throttling methods to try and control the amount of invitational content delivered as part of a viral campaign. For example, the campaign engine 250 can attempt to maintain the campaign within a daily spend range dictated by a content provider. To keep the campaign within this spend range, the campaign engine 250 can use various throttling methods to both increase and decrease the number of items of invitational content delivered.

For example, in some embodiments, the campaign engine 250 can be configured to deliver the item of invitational content without a user interface element enabling a user to forward the item of invitational content. Delivering the item of invitational content without the user interface element prevents the item of invitational content from being forwarded and thus can reduce the number of requests for the item of invitational content.

In some embodiments, the campaign engine 250 can be configured to stop delivering the item of invitational content in response to new requests for invitational content and only return the item of invitational content in response to requests resulting from a forwarded item of invitational content. This type of embodiment can be also be useful to deter users from forwarding an item of invitational content without use of the provided user interface element. For example, if a user attempts to forward the item by sharing a URL address associated with the item of invitational content.

In some embodiments, the campaign engine 250 can be configured to use metrics calculated by the metrics module 245 to manage the campaign. For example, the campaign engine 250 can use the calculated viral coefficient to either increase or decrease the number of requests received for the item of invitational content and thus manage the spend. To increase the number of requests received, the campaign engine can deliver the item of invitational content in response to requests from a user, location, or other factor that have a high calculated viral coefficient. To lower the number of requests, the campaign engine 250 can deliver a different item of invitational content or the item of invitational content without a user interface element in response to a request from a user, location, or other factor that has a high calculated viral coefficient.

A viral coefficient can be determined to be high in numerous ways. For example, in some embodiments, predetermined ranges can be set for a viral coefficient and viral coefficients within a specified one of the predetermined ranges can be considered to be high. In some embodiments, a viral coefficient can be determined to be high based on a comparison with the viral coefficient calculated for other users, location, etc. Thus a viral coefficient can be considered to be high if it is within a certain percentile such as the top tenth percentile of calculated viral coefficients. This type of embodiment can be used in conjunction with a set floor. For example, the top tenth percentile can be considered to be high as long as the viral coefficient is above 1.

In some embodiments, the campaign engine 250 can be configured to condition delivery of the item of invitational content and inclusion of the user interface element on a viral coefficient associated with a received request. The metrics module 245 can be configured to calculate a viral coefficient for each request based upon a specific factor or combination of factors associated with the request. For example, in some embodiments, the viral coefficient associated with a request can be based on a single factor such as the requesting user. In some embodiments, the viral coefficient can be based upon multiple factors such as the requesting user and the location of the request.

To determine the viral coefficient of a request using multiple factors, in some embodiments, the viral coefficient of each factor can be averaged to determine the viral coefficient of the request as a whole. In some embodiments, the metrics module 245 can be configured to calculate a viral coefficient for the specific combination of factors. In some embodiments, each factor can be weighted when determining the viral coefficient for the entire request. For example, the viral coefficient of the requesting user can be weighted to be the most important factor with other factors having a lesser influence on the calculation.

The campaign engine 250 can be configured to use predetermined viral coefficient ranges to determine whether to deliver the item of invitational content or whether to include the user interface element with the item of invitational content. The predetermined ranges can be set and adjusted to increase or decrease the delivery of the item of invitational content.

In some embodiments, the campaign engine 250 can be configured to manage a viral campaign based on factors other than the campaign spend. For example, in some embodiments, the viral campaign can dictate performance preferences and the campaign engine 250 can be configured to optimize the campaign based on these performance preferences. In some embodiments, the performance preferences can indicate specific metrics to be optimized. For example, the specific metrics can include metrics regarding interaction with the item of invitational content such as time spent viewing the item of invitational content or amount of invitational content viewed (i.e., views, pages, etc.). The performance preferences can dictate a preferred range or minimum performance for the metrics.

To optimize the campaign based on these metrics, the campaign engine 250 can be configured to return the item of invitational content in response to requests from users with calculated values for the metrics that are within the specified range of that at least meet the specified minimum performance. For example, if the performance preferences dictate that each item of invitational content should be viewed for at least 60 seconds, the campaign engine 250 can return the item of invitational content in response to requests from users determined to spend at least 60 seconds viewing items of invitational content.

In some embodiments, the requirement that the requesting user meet the specified metric is only enforced upon a determination that the metric is not in the specified range or in danger of leaving the specified range. Thus, upon a determination that the time spent viewing the item of invitational content is dipping below, or is about to dip below, the exemplary 60 second threshold, the campaign engine 250 can begin returning the item of invitational content to only requests from users that view items of invitational content for at least 60 seconds.

Alternatively, in some embodiments, the threshold can be increased above the value stated in the performance preferences if the metric is falling well below the value dictated by the performance preferences. For example, if the amount of time the item of invitational content is viewed dips to 40 seconds, the campaign engine can begin returning the item of invitational content only in response to requests from users that view items of invitational content at least 80 seconds.

In some embodiments, the campaign engine 250 can use contacts metrics associated with a user to optimize the campaign based on the specified performance metrics. For example, to increase the amount of time an item of invitational content is viewed, the campaign engine 250 can deliver the item of invitational content in response to requests from users that have contacts with a calculated average view time above the value specified by the performance preferences, even if the requesting user does not have an average view time above the value specified by the performance preferences. Alternatively, in some embodiments, the calculated likelihood of a requesting user to forward the item of invitational content can be considered in addition to the contacts metrics associated with the requesting user. For example, if a requesting user has a high calculated likelihood of forwarding an item of invitational content or on average forwards an item of invitational content numerous times, the contacts metrics associated with the requesting user can be given greater consideration when determining whether to deliver the item of invitational content in response to the requesting user's request because there is a ultimately a greater likelihood that the requesting user's contacts will view the item of invitational content.

Figure 4:
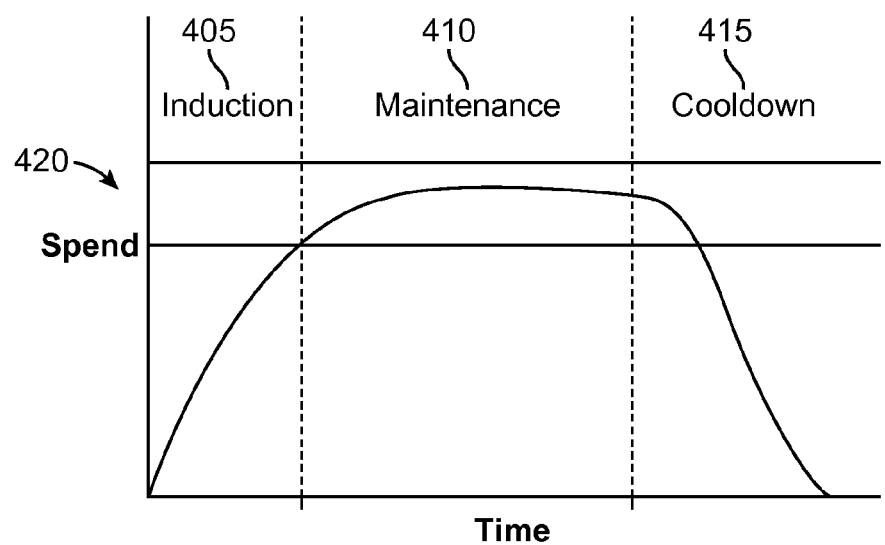
FIG. 4 illustrates a chart describing the lifecycle of a viral campaign.

FIG. 4 illustrates a chart describing the lifecycle of a viral campaign. As illustrated, the chart shows the daily spend versus time. The daily spend represents the total cost spent on delivering the item of invitational content in a single day. The chart is broken into three phases of a viral campaign; induction 405, maintenance 410 and cool down 415. Further, a target daily spend range 420 is illustrated. The target daily spend range 420 represents the daily spend range (max and minimum daily limit), which a content provider has set for the viral campaign.

A viral campaign delivers invitational content in response to two different types of requests. The first type of request is a general request for an item of invitational content in which no specific item of invitational content is requested and the item of invitational content returned can be selected from a selection of different items of invitational content. The second type of request is a specific request that identifies the specific item of invitational content to be returned. This type of request results from a forwarded item of invitational content and includes a unique identifier.

Ideally, a viral campaign can be managed in such a way that the daily spend remains within the target daily spend range 420 as a result of all specific requests. This allows other items of invitational content to be returned to general requests. To achieve this, during the induction phase 405, invitational content is initially delivered in response to general requests. To increase the number of specific results as quickly as possible, the campaign can be aggressively optimized for virality, or in other words, optimized to grow virally as quickly as possible. For example, the item of invitational content can be returned in response to general requests that will result in the campaign growing quickly such as general requests with a high calculated viral coefficient or fast forward time. Delivering the item of invitational content to users, locations, etc., determined to have a high viral coefficient or fast forward time and that are considered to be key influencers can quickly ramp up the viral campaign to get within the target daily cap range 420.

A forwarding time can be determined to be fast in numerous ways. For example, in some embodiments, a predetermined time can be set and all forwarding times that are lower than the predetermined time can be considered to be fast. In some embodiments, a forwarding time can be determined to be fast based upon an analysis of multiple calculated forwarding times. For example, a forwarding time can be determined to be fast if it is within a certain percentile of the calculated forwarding times of a population of users. Thus it can be determined that a forwarding time is fast if the forwarding time is within the top tenth percentile of forwarding times.

Once the spend is within the target daily cap range 420, the campaign begins the maintenance phase 410 in which throttling techniques can be used to slightly adjust the spend to remain within the target daily cap range 420. For example, if the spend is getting too high, the item of invitational content can be delivered without a user interface element enabling a user to forward the item of invitational content. Alternatively, if the spend begins to dip, the item of invitational content can be returned in response to a greater number of general request as well as returned to requests determined to have a high viral coefficient.

In some embodiments, users can be offered incentives or rewards to forward an item of invitational content in an effort to increase the spend of a campaign. For example, a user can receive a coupon, credit, money, etc. for forwarding a predetermined number of items of invitational content.

Offering incentives can be further advantageous because, in some embodiments, the cost associated with delivering an item of invitational content can vary depending upon the type of request the item of invitational content is delivered in response to. For example, delivering an item of invitational content in response to a specific request can have a lower cost to a content provider than delivering an item of invitational content in response to a general request. Thus increasing the number of specific requests can be advantageous because it would result in more items of invitational content being delivered within the spend allotted to the campaign.

As the campaign nears the end, the campaign enters a cool down phase 415 in which throttling techniques can be used to reduce the spend. For example, this can include discontinuing delivering the item of invitational content in response to general request and/or delivering the item of invitational content without a user interface element enabling forwarding. In some embodiments, delivering the item of invitational content to specific requests can be discontinued. For example, a user making a specific request for the item of invitational content can be forwarded to a website associated with the content provider of the invitational content rather than the item of invitational content itself.

Figure 5:
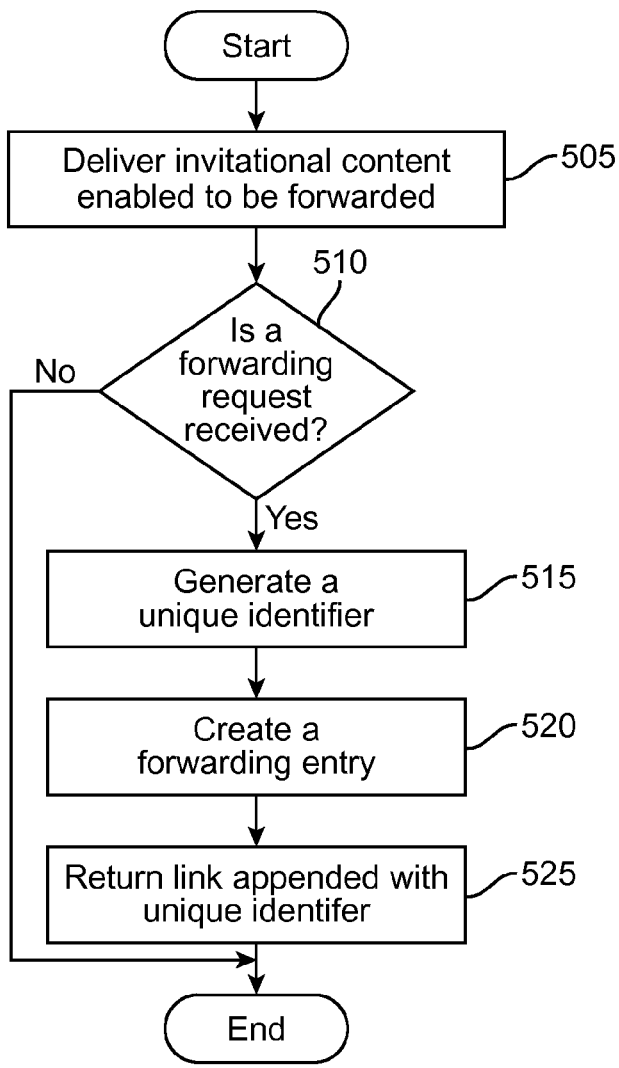
FIG. 5 illustrates an exemplary method embodiment of forwarding an item of invitational content.

FIG. 5 illustrates an exemplary method embodiment of forwarding an item of invitational content. As illustrated, the method begins at block 505 where an item of invitational content enabled to be forwarded is delivered to a user device. Once the item of invitational content has been delivered, the method can continue to block 510 where it is determined whether a forwarding request has been received. If a forwarding request has been received, the method continues to block 515 where a unique identifier is generated. The method then continues to block 520 where a forwarding entry is created. The forwarding entry can include the generated unique identifier as well as an identifier identifying the item of invitational content. If at block 510 a forwarding request has not been received, the method ends.

After the forwarding entry is created, the method continues to block 525 where the generated unique identifier is appended to a link and the link with appended identifier is returned to the requesting user. In some embodiments, the link can be a link to a content delivery server configured to deliver items of invitational content. In some embodiments, the computing device that receives the forwarding request and thus performs the method described in FIG. 5 is the content delivery server and thus the link is a link to computing device that creates the link. In some embodiments, the content delivery server is a different computing device than the computing device that receives the forwarding request.

Figure 6:
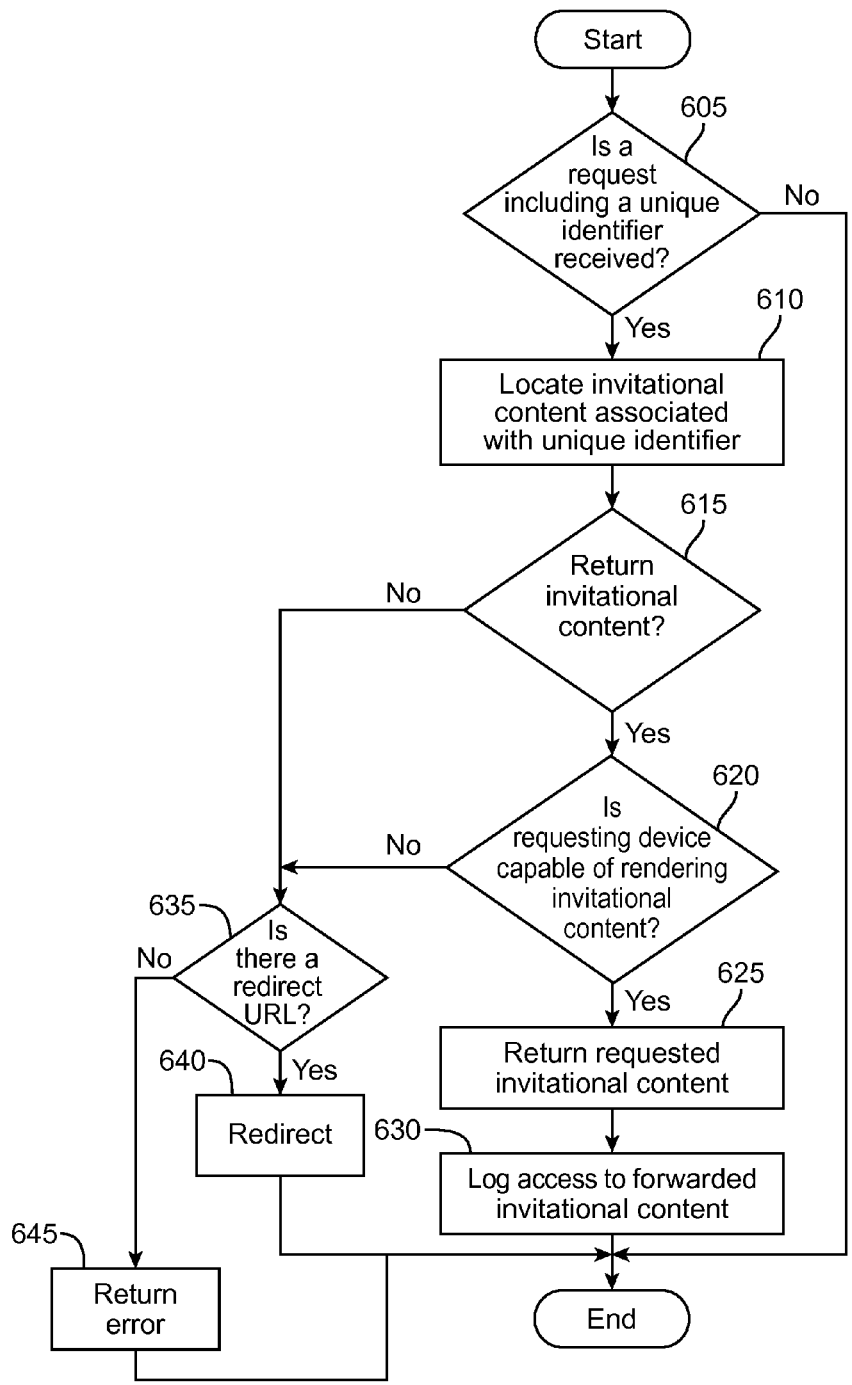
FIG. 6 illustrates an exemplary method embodiment of delivering a forwarded item of invitational content.

FIG. 6 illustrates an exemplary method embodiment of delivering a forwarded item of invitational content. The method begins at block 605 where it is determined if a request including a unique identifier has been received. If a request including a unique identifier is received at block 605, the method continues to block 610 where the item of invitational content corresponding to the unique identifier is located. To accomplish this, the unique identifier included with the request can be used to locate the corresponding forwarding entry. Once the forwarding entry is located, an identifier identifying the item of invitational content associated with the forwarding entry can be retrieved and used to locate the item of invitational content.

Once the item of invitational content is identified, the method continues to block 615 where it is determined whether the item of invitational content should be returned. For example, the campaign associated with the item of invitational content may have ended or a daily spend limit may have been exceeded.

If it is determined that the item of invitational content should be returned, the method continues to block 620 where it can be determined whether the requesting device is capable of rendering the item of invitational content. For example, in some embodiments, the item of invitational content can be a rich media advertisement or game that requires minimum device capabilities to be rendered properly. The capabilities of the device can be determined prior to delivery to ensure that the item of invitational content will be rendered properly by the requesting device. In some embodiments, the UUID associated with the requesting device can be used to check a database entry associated with the device that includes the device specifications. In some embodiments, the request received from the device can include metadata that indicates the device's specifications. The device specifications can be compared to minimum specifications required to render the item of invitational content to determine whether the device is capable of rendering the item of invitational content.

If it is determined that the requesting device is capable of rendering the item of invitational content, the method continues to block 625 where the requested invitational content is delivered to the requesting device. At block 630, the delivery of the item of invitational content is logged. This log can be associated with the item of invitational content as well as the unique identifier. For example, the forwarding entry associated with the unique identifier can include a count that can be incremented to log the delivery of the item of invitational content.

If at block 615 it is determined that the item of invitational content should not be delivered, the method continues to block 635 where it is determined if a redirect URL is provided. For example, the redirect URL can lead to a website associated with the content provider of the item of invitational content. If there is a redirect URL, the method continues to block 640 and the user device is redirected to the redirect URL. If at 635 it is determined that there is not redirect URL, the method continues to block 645 where an error message is returned to the requesting device and the method ends.

If at block 620 it is determined that the requesting device is not capable of rendering the item of invitational content, the method continues to block 635 where it is determined if there is a redirect URL. If there is a redirect URL, the user device is redirected 640 to the redirect URL. If there is not a redirect URL, an error message is returned 645 and the method ends.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method comprising:
    receiving, by a processor, a forwarding request from a first requesting device, the forwarding request requesting to forward an item of invitational content;
    upon receiving the forwarding request, generating a unique identifier;
    creating a forwarding entry, the forwarding entry including the unique identifier and an identifier identifying the item of invitational content;
    returning, by the processor, to the first requesting device, a link to a content delivery server appended with the unique identifier;
    delivering the item of invitational content to a second requesting device in response to receiving a request from the second requesting device, wherein the item of invitational content is delivered as part of a viral campaign that dictates a target spend range for the viral campaign; and
    utilizing at least one throttling method to manage a spend of the viral campaign.

2. The method of claim 1, wherein the forwarding request was transmitted by the first requesting device upon having received a selection on a user interface element provided with the item of invitational content rendered on the first requesting device.

3. The method of claim 1, wherein the request is a general request that does not specify a specific item of invitational content to be returned.

4. The method of claim 1, wherein the request is a specific request that includes the unique identifier, wherein the specific request is created as a result of a user selecting the link appended with the unique identifier.

5. The method of claim 4, further comprising:
    upon receiving a specific request appended with the unique code from the second requesting device:
        accessing the forwarding entry associated with the unique identifier; and
        identifying the item of invitational content identified by the forwarding entry associated with the unique identifier.

6. The method of claim 1, further comprising:
    upon a determination that the spend needs to be increased, providing a user interface element configured to create a forwarding request along with the item of invitational content.

7. The method of claim 1, further comprising:
    upon a determination that the spend needs to be increased, delivering the item of invitational content in response to a request with a high calculated viral coefficient.

8. The method of claim 1, further comprising:
    upon a determination that the spend needs to be decreased, providing the item of invitational content without a user interface element configured to create a forwarding request.

9. The method of claim 1, further comprising:
    upon a determination that the spend needs to be decreased, delivering a different item of invitational content in response to receiving the request from the second requesting device.

10. A system comprising:
    a processor; and
    memory containing instructions that, when executed, cause the processor to:
        receive a forwarding request from a first requesting device, the forwarding request requesting to forward an item of invitational content;
        upon receiving the forwarding request, generate a unique identifier;
        create a forwarding entry, the forwarding entry including the unique identifier and an identifier identifying the item of invitational content;
        return to the first requesting device, a link to a content delivery server appended with the unique identifier;
        deliver the item of invitational content to a second requesting device in response to receiving a request from the second requesting device, wherein the item of invitational content is delivered as part of a viral campaign that dictates a target spend range for the viral campaign; and
        utilize at least one throttling method to manage a spend of the viral campaign.

11. The system of claim 10, wherein the forwarding request was transmitted by the first requesting device upon having received a selection on a user interface element provided with the item of invitational content rendered on the first requesting device.

12. The system of claim 10, wherein the request is a general request that does not specify a specific item of invitational content to be returned.

13. The system of claim 10, wherein the request is a specific request that includes the unique identifier, wherein the specific request is created as a result of a user selecting the link appended with the unique identifier.

14. The system of claim 13, wherein the instructions further cause the processor to:
    upon receiving a specific request appended with the unique code from the second requesting device:
        access the forwarding entry associated with the unique identifier; and
        identify the item of invitational content identified by the forwarding entry associated with the unique identifier.

15. The system of claim 10, wherein the instructions further cause the processor to:
    upon a determination that the spend needs to be increased, provide a user interface element configured to create a forwarding request along with the item of invitational content.

16. The system of claim 10, wherein the instructions further cause the processor to:
upon a determination that the spend needs to be increased, deliver the item of invitational content in response to a request with a high calculated viral coefficient.

17. The system of claim 10, wherein the instructions further cause the processor to:
upon a determination that the spend needs to be increased, deliver the item of invitational content in response to a request from a user with a calculated fast forwarding time.

18. The system of claim 10, wherein the instructions further cause the processor to:
upon a determination that the spend needs to be decreased, deliver a different item of invitational content in response to receiving the request from the second requesting device.

19. A non-transitory computer-readable medium containing instructions that, when executed by a computing device, cause the computing device to:
receive a forwarding request from a first requesting device, the forwarding request requesting to forward an item of invitational content;
upon receiving the forwarding request, generate a unique identifier;
create a forwarding entry, the forwarding entry including the unique identifier and an identifier identifying the item of invitational content;
return, to the first requesting device, a link to a content delivery server appended with the unique identifier;
deliver the item of invitational content to a second requesting device in response to receiving a request from the second requesting device, wherein the item of invitational content is delivered as part of a viral campaign that dictates a target spend range for the viral campaign; and
utilize at least one throttling method to manage a spend of the viral campaign.

20. The non-transitory computer-readable medium of claim 19, wherein the forwarding request was transmitted by the first requesting device upon having received a selection on a user interface element provided with the item of invitational content rendered on the first requesting device.

21. The non-transitory computer-readable medium of claim 19, wherein the request is a general request that does not specify a specific item of invitational content to be returned.

22. The non-transitory computer-readable medium of claim 19, wherein the request is a specific request that includes the unique identifier, wherein the specific request is created as a result of a user selecting the link appended with the unique identifier.

23. The non-transitory computer-readable medium of claim 22, wherein the instructions further cause the computing device to:
upon receiving a specific request appended with the unique code from the second requesting device:
access the forwarding entry associated with the unique identifier; and
identify the item of invitational content identified by the forwarding entry associated with the unique identifier.

24. The non-transitory computer-readable medium of claim 19, wherein the instructions further cause the computing device to:
optimize the viral campaign based upon performance preferences dictated by the viral campaign.

25. The non-transitory computer-readable medium of claim 24, wherein the performance preferences dictate a preferred amount of time for the item of invitational content to be viewed and the instructions further cause the computing device to:
deliver the item of invitational content in response to requests from users determined to view invitational content within the preferred amount of time.

26. The non-transitory computer-readable medium of claim 24, wherein the performance preferences dictate a preferred amount of time for the item of invitational content to be viewed and the instructions further cause the computing device to:
deliver the item of invitational content in response to requests from a user associated with a contacts metric indicating that the user's contacts view invitational content within the preferred amount of time.

27. The non-transitory computer-readable medium of claim 26, wherein the contacts metric associated with the user is calculated based upon data gathered upon the user's contacts interacting with an item of invitational content forwarded by the user.

* * * * *